(12) United States Patent
Brown et al.

(10) Patent No.: US 9,347,399 B1
(45) Date of Patent: May 24, 2016

(54) LASER IGNITION FOR LIQUID PROPELLANT ROCKET ENGINE INJECTORS

(75) Inventors: William S. Brown, Newbury Park, CA (US); Glenn T. Bennett, Boulder, CO (US)

(73) Assignee: AEROJET ROCKETDYNE OF DE, INC., Canoga Park, CA (US)

( * ) Notice: Subject to any disclaimer, the term of this patent is extended or adjusted under 35 U.S.C. 154(b) by 1826 days.

(21) Appl. No.: 08/988,059

(22) Filed: Dec. 10, 1997

(51) Int. Cl.
*F02K 9/00* (2006.01)
*F02K 9/95* (2006.01)

(52) U.S. Cl.
CPC .... *F02K 9/00* (2013.01); *F02K 9/95* (2013.01)

(58) Field of Classification Search
CPC ... F02K 9/00; F02K 9/95; F23R 2900/00006; F02C 7/264
USPC ............. 102/200, 201; 60/258, 257, 39.06, 60/39.141, 39.821; 431/254, 258, 259, 431/354
See application file for complete search history.

(56) References Cited

U.S. PATENT DOCUMENTS

| | | | | |
|---|---|---|---|---|
| 3,545,203 A | * | 12/1970 | Rumbold | 60/258 |
| 3,662,547 A | * | 5/1972 | Paine et al. | 60/258 |
| 3,667,232 A | * | 6/1972 | Mitchell et al. | 60/258 |
| 3,699,772 A | * | 10/1972 | Elverum, Jr. | 60/258 |
| 3,780,952 A | * | 12/1973 | Huang | 60/258 |
| 4,206,594 A | * | 6/1980 | Elverum, Jr. | 60/258 |
| 4,302,933 A | * | 12/1981 | Smith | 60/261 |
| 4,707,982 A | * | 11/1987 | Wagner | 60/258 |
| 4,947,640 A | * | 8/1990 | Few et al. | 60/39.06 |
| 5,161,379 A | * | 11/1992 | Jones et al. | 60/258 |
| 5,223,651 A | * | 6/1993 | Stickler et al. | 60/218 |
| 5,367,869 A | * | 11/1994 | DeFreitas | 60/39.06 |
| 5,497,612 A | * | 3/1996 | Few et al. | 60/39.06 |
| 5,769,621 A | * | 6/1998 | Early et al. | 60/39.06 |
| 5,845,480 A | * | 12/1998 | DeFreitas et al. | 60/39.06 |
| 5,857,323 A | * | 1/1999 | Beveridge et al. | 60/258 |
| 5,876,195 A | * | 3/1999 | Early | 60/39.828 |

* cited by examiner

*Primary Examiner* — Ehud Gartenberg
*Assistant Examiner* — William Breazeal
(74) *Attorney, Agent, or Firm* — Joel G Landau

(57) ABSTRACT

A laser beam is utilized to ignite the fuel and oxidizer injected into a combustion chamber. An injector has a plurality of injector elements each injecting fuel and oxidizer into a flame holding zone adjacent the injector face plate where fuel and oxidizer are mixing at a rate to sustain flammability. The laser beam is introduced parallel to the injector face plate passing through the fuel and oxidizer mixing zones igniting the propellants. The propellants are ignited by having a laser beam tuned to a frequency to excite the oxidizer such that it will chemically combine with the fuel to form an ignition kernel in the flame holding zone. When a plurality of injector elements are ignited in this manner a controlled ignition process in the combustion chamber is achieved.

9 Claims, 2 Drawing Sheets

LASER IGNITION FOR LIQUID PROPELLANT ROCKET ENGINE INJECTORS

BACKGROUND OF THE INVENTION

1. Field of the Invention

This invention relates to laser ignition of propellants, and more particularly for laser excitation of high velocity oxygen for chemically combining with high velocity hydrogen in the flame holding zone of rocket engine injectors.

2. Description of the Related Art

In the past lasers have been used to ignite propellants. Several patents relate to lasers as a replacement for spark plugs in piston driven internal combustion automobile engines. Other patents relate to lasers for igniting hydrocarbon fuels in the combusters of turbine engines.

Current gas generators and preburners utilize a centrally located core ignition system. A centrally located ignition torch or flame coupled with the low mixture ratio results in un-ignited injector zones which increase thermal strain on the turbine blades and may result in combustion pops.

None of the prior art deals with igniting the flame holding zone of injectors in rocket engines. Prior methods used could not light the propellants from a multiplicity of injector elements simultaneously for a good distribution of ignition points which minimizes deflagration or detonation.

SUMMARY OF THE INVENTION

A laser beam is used to ignite propellants in the flame holding zone of an injector. The laser splits oxygen molecules into oxygen atoms and then places the oxygen atoms in an excited state where they will chemically react with other atoms easily. Since the excited oxygen atoms are in proximity of other oxygen atoms and hydrogen atoms in the flame holding zone of an injector when the laser beam is applied, the excited oxygen can react with a hydrogen molecule thereby igniting the oxygen and hydrogen propellants in the combustion chamber of a rocket engine. Laser ignition at multiple injector elements assures even flame distribution, eliminates start temperature spikes and eliminates combustor detonation pops.

OBJECTS OF THE INVENTION

It is an object of the invention to ignite propellants in the flame holding zone of an injector.

It is an object of the invention to provide multiple element ignition.

It is an object of the invention to eliminate ignition delays.

It is an object of the invention to improve flame propagation.

It is an object of the invention to improve flame distribution.

It is an object of the invention to eliminate combustion pops.

It is an object of the invention to lower thermal stress on related components.

It is an object of the invention to eliminate start temperature spikes.

It is an object of the invention to provide for immediate refire or continuous ignition capability.

It is an object of the invention to lower the power requirements of the laser system for igniting propellants in a vehicle combustion chamber.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
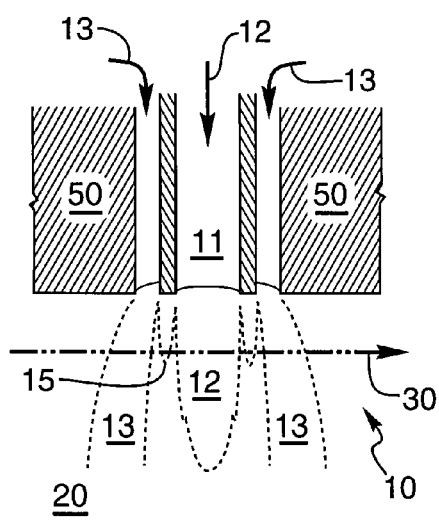
FIG. 1 is a cross-sectional side view of a coaxial injector element in a rocket engine with the propellants being ignited by a laser beam.

Rocket engine injectors have high velocity propellant injectors. It is important for efficient and even burning of the propellants that they be mixed thoroughly and ignited evenly. Uneven burning of the propellants in the combustion chamber can cause damage to the combustion chamber from explosions and heat stress and may result in damage to turbine blades.

Many combustion systems utilize coaxial injector elements for bi-propellant injection into the combustion chamber. These coaxial elements typically inject oxidizer through a central post and the fuel through the surrounding annulus. The shear flow created at the boundary of the fuel and oxidizer is utilized to atomize and mix the propellants prior to combustion. This type of reaction creates a range of zones of high or infinite mixture ratios (oxidizer/fuel) through to very low mixture ratio. In addition the propellant injection velocities are typically very high, sometimes exceeding the flame propagation speeds. As a result, ignition propagation across several elements at the injector face, going from 0 to infinite mixture ratios, in high velocity flow streams, is sometimes very difficult or unreliable at best.

Current gas generator and preburners utilize a centrally located core ignition system. A centrally located ignition torch or flame coupled with the low mixture ratio operation result in un-ignited injector zones which increase thermal strain on turbine blades. Temperature spikes during the start transient reduce the structural durability of the blades and turbine structure. Low mixture ratio propellants ignition using conventional methods also results in ignition delays, poor flame propagation to the remaining un-ignited elements and combustion "pops".

An oxygen to hydrogen coaxial injector element has a flame holding zone in the wake of the oxidizer post tip during a steady stage combustion. Once this zone is ignited the combustor system can be operated at mixture ratios much lower than the well mixed flammability limit.

A laser ignition system which ignites multiple flame holding zones across an injector has many advantages. The mixture ratios in the flame holding zone are steady and ignitable. The flame from the flame holding zone can then ignite the remainder of the propellants in the combustion chamber. A multiplicity of such flame holding zones ignited simultaneously by a laser provides improved flame propagation, eliminates temperature spikes which can cause thermal stress and combustion pops which can damage an engine. The improved flame distribution sets off the combustion of the propellants in the combustion chamber more evenly and provides for immediate fire, refire, or continuous ignition capability.

In order to ignite multiple flame holding zones, a method or process of ignition is necessary which is unobtrusive yet retains access to the ignition locations.

The method and apparatus employed as presented herein utilizes, as a preferred embodiment, an ultraviolet laser beam of specific wavelength necessary to place the amount of energy required to ignite the injector elements flame holding zone 15.

Referring to FIG. 1, a section of an injector having a coaxial injector element is shown generally as 10. The coaxial injector element 10 has a lox post 11 for coaxially injecting oxygen 12 into a combustion chamber. A fuel 13, such as hydrogen, is introduced to the combustion chamber coaxially with the oxygen 12, separated from the fuel 13 by lox post 11. The fuel 13 and oxygen 12 mix in the flame holding zone 15 at the tip of the lox post 11. The fuel and oxygen have recirculation in the flame holding zone 15 which mix the fuel 13 and the oxygen 12 such that they can be ignited in this zone by an ignition source. The flame holding zone 15 typically has a recirculation area of low velocity propellants mixed together. The long loitering times of the fuel 13 and oxygen 12 in flame holding zone 15 allows the ignition process to occur. The ignition kernal in the flame holding zone 15 then propagates, lighting the area around the flame holding zones of the coaxial injector element 10. The flame then ignites the balance of the propellants for a more even burn as the fuel 13 and oxygen 12 move at high velocity past the flame holding zone 15.

Only specific wavelengths of light have the correct energy to excite an electron in an atom to a higher energy level. An ultraviolet laser beam with the wavelength of 225.6 nm can be used to produce a two photon excitation of oxygen wherein the first photon strikes an oxygen molecule and splits it into two oxygen atoms. The second photon strikes an oxygen atom and excites the outer shell electron such that it will chemically react easily with a neighboring atom. Since this oxygen atom is placed in the excited state in the flame holding zone 15 where oxygen and fuel are mixed together oxygen will exothermally combine with hydrogen molecules.

Figure 2:
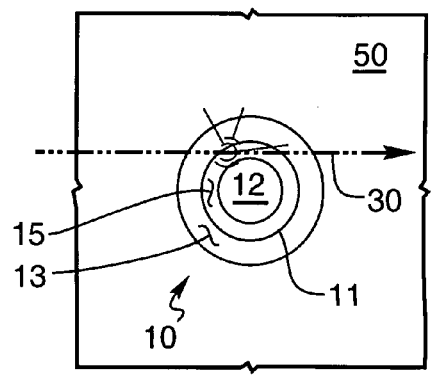
FIG. 2 is a bottom view of a coaxial injector element in a rocket engine with the propellants being ignited by a laser beam.

As shown in FIG. 2, the laser beam 30 only has to cross a portion of the flame holding zone 15 of a coaxial injector element 10 to ignite the fuel 13 and oxygen 12 emanating from the coaxial injector element 10. The laser 30 crosses the flame holding zone 15 on the top third of the annular flame holding zone 15. This maximizes the cross section of the flame holding zone 15 which can be ignited by a laser beam 30. The laser beam can pass through any portion of the mixing zone and cover a percentage of the mixing zone of from near zero to 100% and still function as long as it can excite oxygen to combine with fuel for a kernel of ignition to exist. In a preferred embodiment, the laser beam 30 had a cross section geometry of ten thousands of an inch by ten thousands of an inch.

Figure 3:
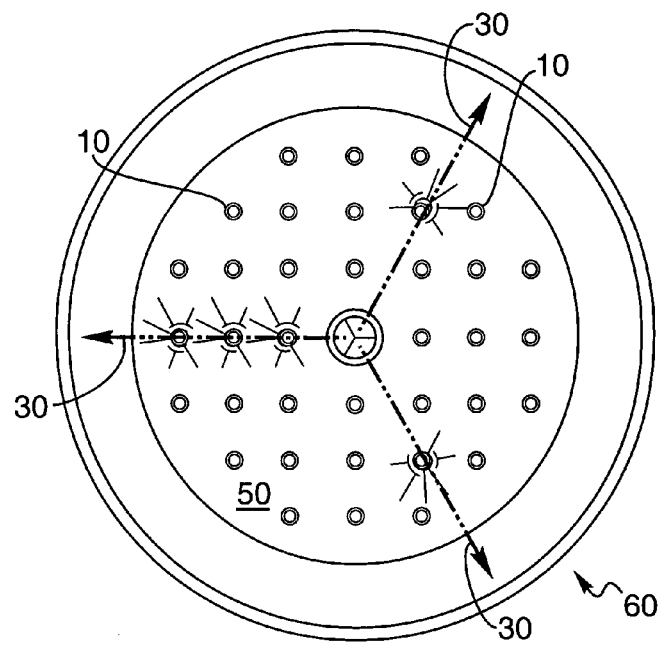
FIG. 3 is a bottom view of a single coaxial injector plate in a rocket engine with the propellants being ignited by a laser beam.

The laser beam 30 should be parallel to the face plate 50 of an injector 60 for igniting a plurality of flame holding zones 15 of coaxial injector elements 10 simultaneously as shown in FIG. 3. By igniting a plurality of coaxial injector elements a more even ignition in the combustion chamber results lowering the thermal spikes caused by uneven combustion across the combustion chamber. A more even combustion also lowers thermal strain on the engine and eliminates combustion pops.

A device for introducing a plurality of laser beams parallel to the injector face plate 50 is disclosed in co-pending U.S. patent application Ser. No. 08/896,737 filed concurrently herewith which is hereby made a part hereof and incorporated herein by reference.

The laser ignition of rocket engine injectors will also work for impinging injectors or any injectors with flame holding zones.

Figure 4:
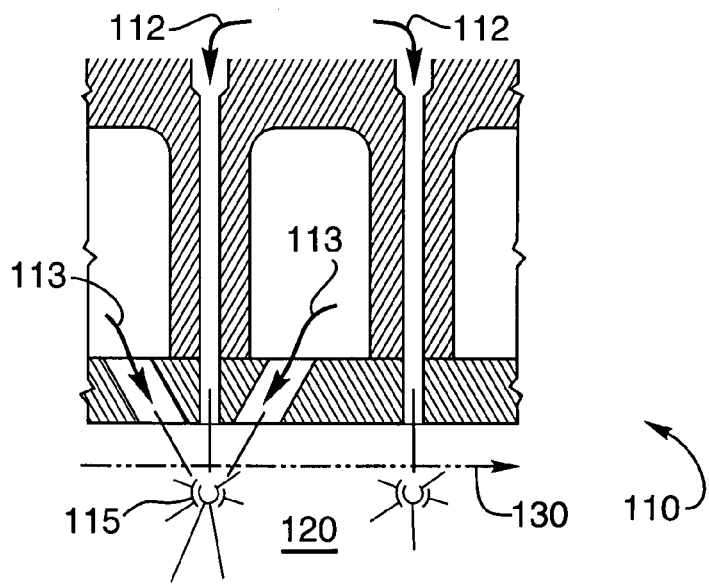
FIG. 4 is a cross-sectional side view of an impinging injector element in a rocket engine with the propellants being ignited by a laser beam.

FIG. 4 shows a side view cross-section of an impinging injector element 110 wherein fuel 113 and oxygen 112 are injected into a combustion chamber 120. In this embodiment flame holding zone 115 is ignited by laser beam 130.

Figure 5:
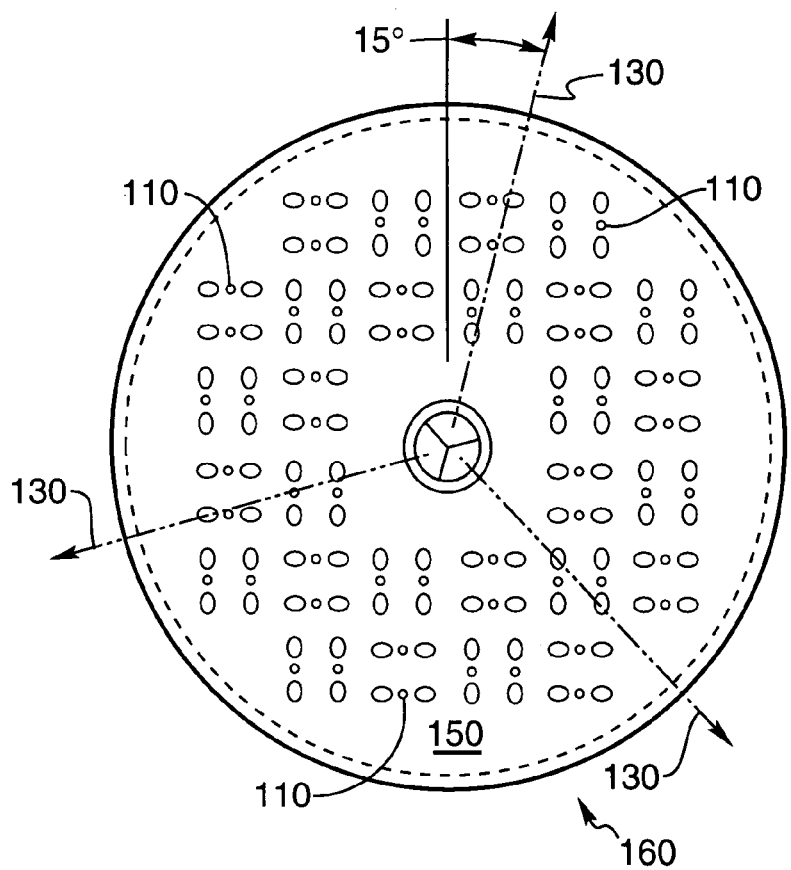
FIG. 5 is a bottom view of an impinging injector face plate in a rocket engine with the propellants being ignited by a laser beam.

FIG. 5 shows an impinging injector 160 having a face plate 150, with laser beams 130 parallel to the surface of the face plate 150 and igniting a plurality of impinging injector elements 110 simultaneously.

Other embodiments of the invention may use lasers to excite fuel rather than oxygen as in this embodiment such that the fuel is excited to chemically combine with available oxygen. Other embodiments with two or more wavelengths of lasers for dissociating and exciting fuels and oxidizers simultaneously are also possible.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An apparatus for igniting propellants, comprising:
   a combustion chamber;
   an injector having at least one injector element for introducing a fuel and an oxidizer into the combustion chamber, the injector having a face plate, wherein each of said at least one injector elements comprises an oxidizer orifice and at least one fuel orifice arranged to inject fuel on opposite sides of the oxidizer orifice, said at least one fuel orifice for injecting the fuel into the combustion chamber and said oxidizer orifice for injecting the oxidizer into the combustion chamber being disposed in said face plate, the portions of the face plate disposed between each oxidizer orifice and associated fuel orifice creating a flame holding zone proximate the face plate in which wakes of both the fuel and oxidizer mix, thereby creating a fuel and oxidizer mix; and
   a laser beam aimed to pass through said flame holding zone, the laser beam having a sufficient intensity and wavelength to ignite the fuel and oxidizer mix within the flame holding zone.

2. The apparatus of claim 1, wherein the face plate is planar, and the laser beam travels substantially parallel to the face plate.

3. The apparatus of claim 1, wherein said at least one injector element comprises a plurality of injector elements.

4. The apparatus of claim 1, wherein the laser beam is an ultraviolet laser beam.

5. The apparatus of claim 1, wherein the laser beam is of a wavelength to excite the oxidizer.

6. The apparatus of claim 5, wherein the oxidizer is oxygen and the laser beam wavelength is 225.6 nm so as to excite the oxygen which will chemically combine with the fuel.

7. The apparatus of claim 1, wherein the laser beam is of a wavelength to excite the fuel.

8. The apparatus of claim 1, wherein the at least one injector element is coaxial.

9. An apparatus for igniting two propellants in a combustion chamber for more even combustion and reduced thermal spikes, comprising:
- a combustion chamber;
- a planar injector face plate defining a plurality of orifices, the plurality of orifices defining a plurality of injector elements, each comprising a respective oxidizer orifice for injecting an oxidizer into the combustion chamber and at least one respective fuel orifice arranged to inject a fuel on opposite sides of the respective oxidizer orifice, wherein a flame holding zone for each injector element is defined by a respective region proximate the face plate and between the respective oxidizer orifice and the respective fuel orifice in which a wake of both the fuel oxidizer mix, thereby creating a fuel and oxidizer mix; and
- a laser beam aimed substantially parallel to the face plate to pass through at least two flame holding zones, the laser beam having a sufficient intensity and wavelength to ignite the fuel and oxidizer mix within the at least two flame holding zones.

\* \* \* \* \*